Oct. 16, 1951  T. A. KOLINS  2,571,258
PNEUMATIC TIRE SHAPING AND VULCANIZING APPARATUS
Filed June 18, 1947  3 Sheets-Sheet 1
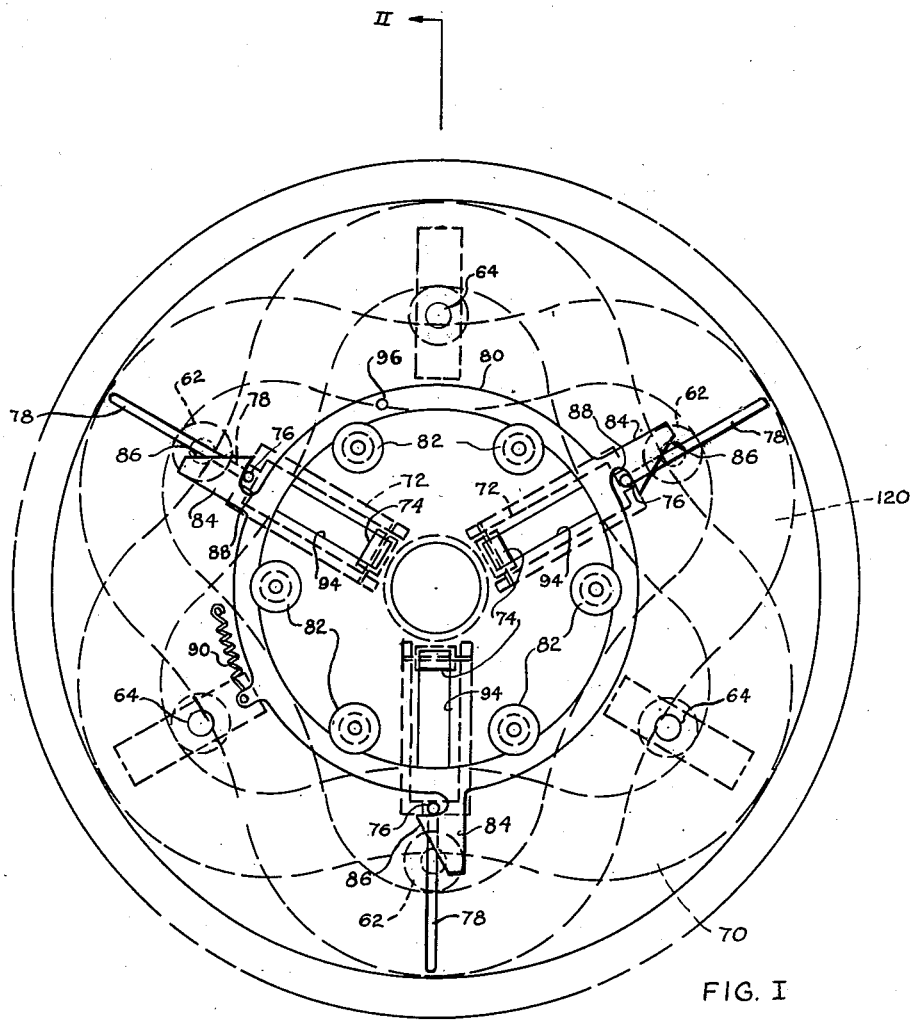
FIG. I
INVENTOR
THOMAS A. KOLINS
BY Oldham & Oldham
ATTORNEYS

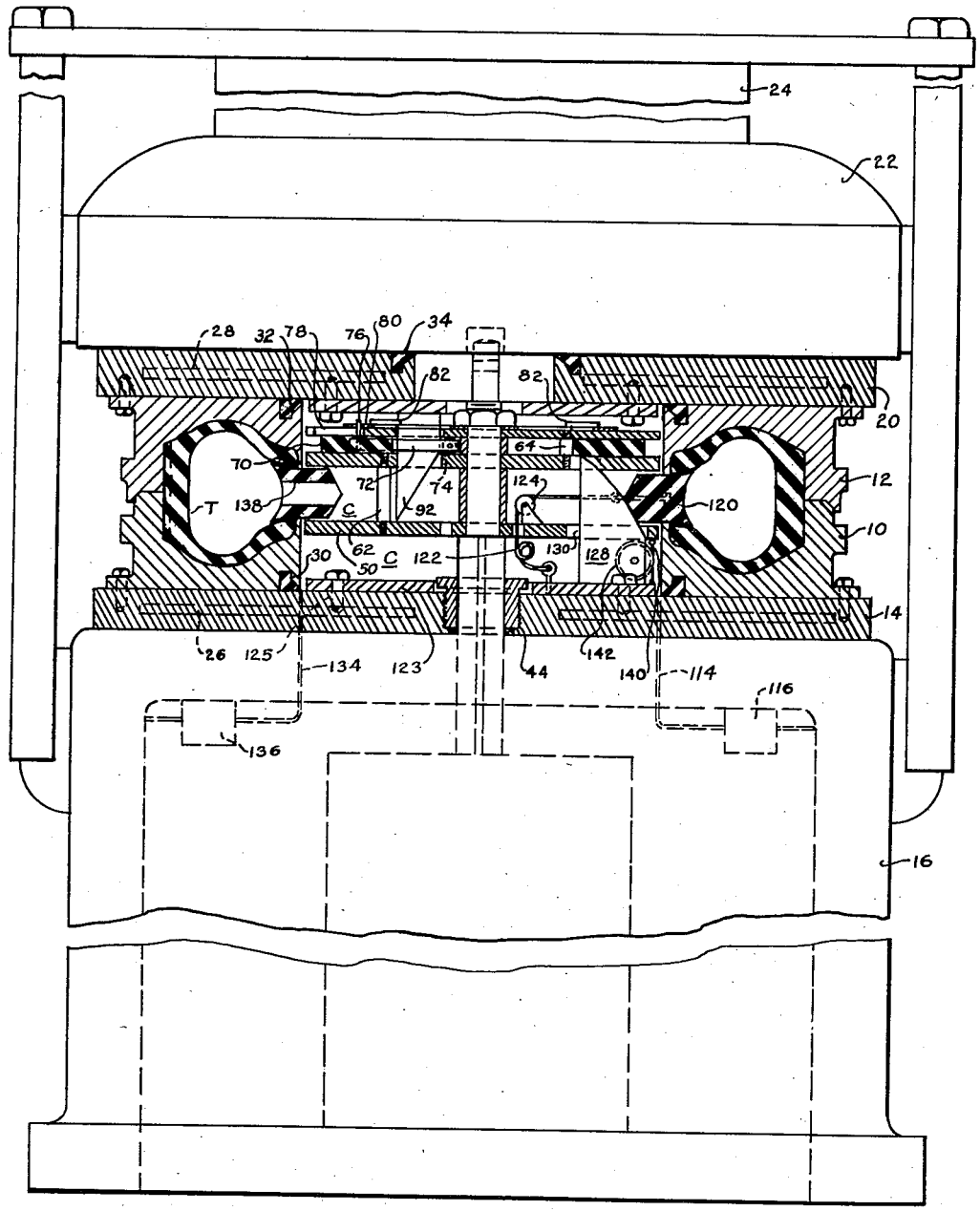
FIG. II

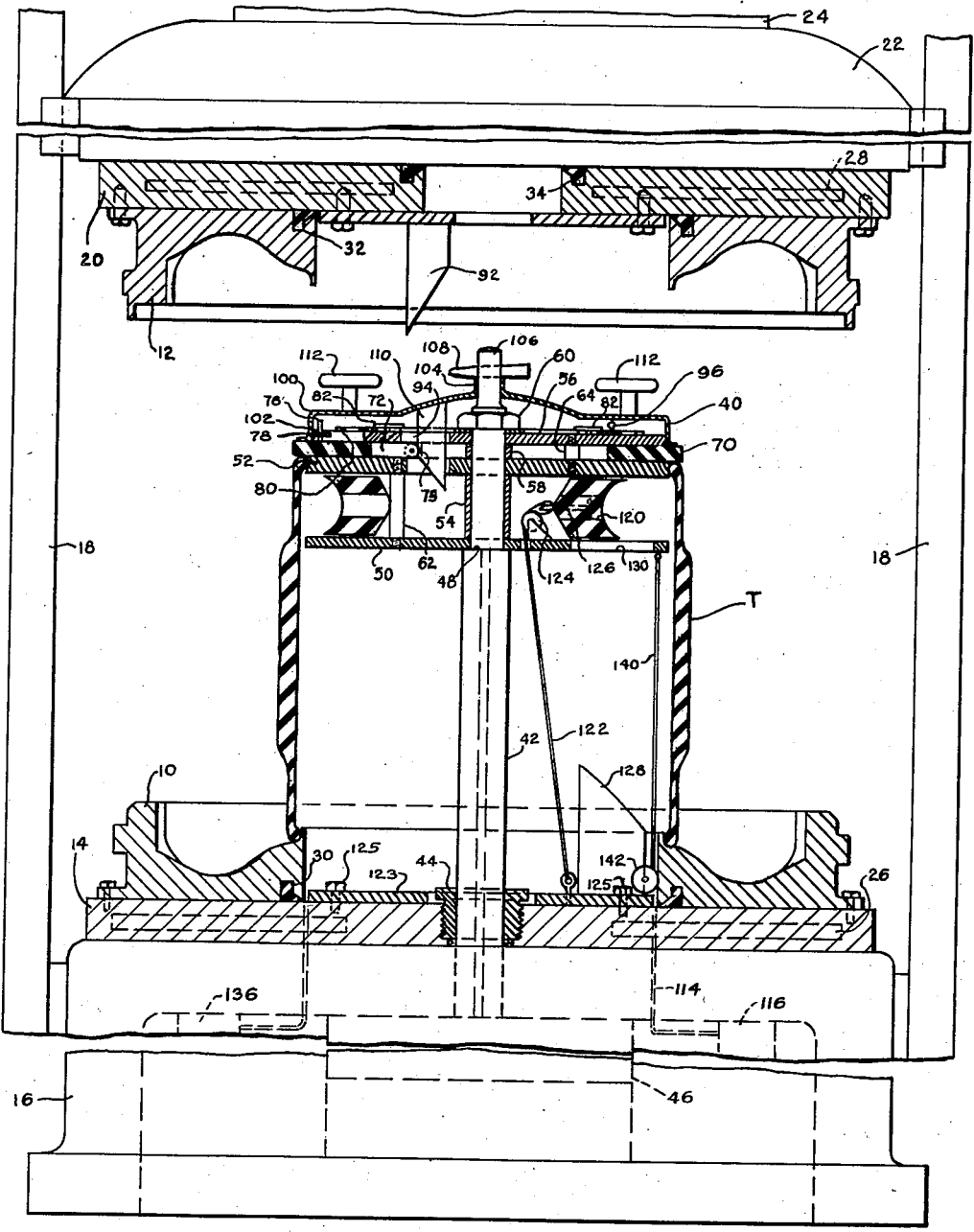
FIG. III

Patented Oct. 16, 1951

2,571,258

UNITED STATES PATENT OFFICE 2,571,258

PNEUMATIC TIRE SHAPING AND
VULCANIZING APPARATUS

Thomas A. Kolins, Akron, Ohio

Application June 18, 1947, Serial No. 755,339

16 Claims. (Cl. 18—17)

This invention relates to apparatus for shaping and/or vulcanizing substantially flat built pneumatic tires, and, more particularly, is concerned with a single unitary apparatus for performing both these functions.

Heretofore, it has been the conventional practice to build pneumatic tires upon substantially flat or slightly crowned building drums, and then to pass the tires to a shaping and bagging apparatus which will shape the tire from the flat or pulley band shape to toric form and simultaneously introduce a heavy rubber air bag therein. The shaped tire with the air bag positioned in it is then passed to a vulcanizing apparatus where the tire and air bag are enveloped in a tire mold, fluild pressure is applied to the air bag to force the tire out into engagement with the mold and the mold is subjected to heat, as may be inside of the air bag, and vulcanization of the tire is effected. The vulcanized tire is removed from the mold, the air bag is removed from the tire, and the air bag is used again to effect the vulcanization of one or more additional tires.

However, in spite of strenuous efforts to prolong the life of an air bag by redesigning its shape or altering its composition, the life of an air bag is limited to a certain number of culcanizing operations after whcih it becomes scrap. It is thus evident that the air bag process of vulcanizing tires not only involves the cost of the various handling operations described and the initial cost, maintenance and plant space of the various pieces of apparatus described, but in addition, the initial, maintenance and replacement cost of the air bags is relatively high.

It has been proposed heretofore to associate bagging and vulcanizing apparatus together and to employ a collapsible air bag therewith, and a number of machines along this line have been built. The collapsible air bag usually takes the form of a substantially cylindrical rubber sleeve which can be expanded into the tire carcass, that is the expanded rubber sleeve assumes a toric shape. Also, collapsible air bags having more of a conventional shape have been utilized in combination apparatus of the type described.

In any event, known apparatus incorporating shaping, air bagging, and vulcanizing mechanisms, have not met with much commercial success, and I believe that this is due to the fact that the collapsible and expansible air bag and/or rubber sleeves, and the mechanism for collapsing and expanding the same, are not satisfactory and are open to the same objections of high wear and maintenance as a result in the conventional air bag practice. Wrinkling, cracking, and folding of the "air bag" portion of the apparatus results with attendant spotty pressure tire vulcanizing operations, and many of the advantages sought after in a combined apparatus are lost.

It is the general object of my invention to avoid and overcome the foregoing and other difficulties of and objections to prior art practices and apparatus such as described by the provision of an improved, relatively inexpensive, easily operated, durable and long lived apparatus for performing the combined functions of pneumatic tire shaping and vulcanization.

Another object of my invention is to provide apparatus of the character described employing a bull ring for sealing the beads of the tire relative to the mold, the bull ring floating in fluid pressure during the tire vulcanizing operation.

Another object of my invention is to provide apparatus which can be associated with a conventional watch case or other tire vulcanizing molds, the mechanism functioning to shape the pneumatic tire cascass and to eliminate an air bag during the vulcanizing operation.

Another object of my invention is the provision of a header mechanism in association with a pair of complementary tire mold parts, the header mechanism including a seal ring for engaging with and moving one tire bead towards the other during a shaping operation, and including a collapsible ring which is expanded between the tire beads as the mold parts close around the tire, the sealing means being collapsed during the movement of the tire mold halves together.

The foregoing objects of my invention, and other objects which will become apparent as the description proceeds, are achieved by the provision of apparatus including a lower platen, a tire mold half mounted in sealing relation on the lower platen, an upper platen, a complementary tire mold half mounted in sealing relation on the upper platen, a header carried by one of the platens, a seal ring carried by the header and adapted to engage with a tire bead of a substantially flat built tire when the other bead is engaged with the bead seat of one of the mold halves, means for moving the header to force the tire beads towards each other, means for supplying fluid under pressure to the inside of the tire carcass during the movement of the beads together, a collapsible bull ring, means for expanding the bull ring between the tire beads, means for moving the platens together to bring the mold halves into register and to cause the bull ring to force the beads into sealing relation with the mold halves, means for collapsing the seal ring prior to movement of the mold halves into register, and means for supplying fluid under pressure between the platens, said bull ring being vented to allow the fluid to flow inside the tire and force it against the mold.

For a better understanding of my invention, reference should be had to the accompanying drawings, wherein:

Fig. 1 is a plan view of the header mechanism associated with the apparatus, but with the back-up cap of the header mechanism removed;

Fig. 2 is a vertical cross-sectional view on a smaller scale of the header mechanism and showing in association also the mold parts and platens enclosed about a tire, and taken substantially on line II—II of Fig. 1; and Fig. 3 is a view similar to Fig. 2 but illustrating the mold parts and platens and header mechanism in the open position about to start a shaping operation on a pneumatic tire carcass.

Haxing reference to the drawings, and particularly Figs. 2 and 3 thereof, the numerals 10 and 12 indicate respectively lower and upper mold halves or parts which are complementary to each other and which are adapted to receive and mold a shaped pneumatic tire cascass, all in the manner well understood in the art. The molds are mounted for movement into a position in register with each other, as seen in Fig. 2, or to a position apart as shown in Fig. 3. It will be understood that various means may be provided to support and move the molds to and from each other, and the relation of the molds and the supporting means may be of the so-called "watchcase" type. In fact, the exact means for mounting and moving the mold parts only indirectly comprises a part of the invention, particularly inasmuch as it is one of the features of my invention that the assembly of apparatus described can be incorporated with conventional tire vulcanizing molds in existence in large quantities in tire producing plants today.

One typical means for mounting the mold parts is illustrated in the drawings as comprising a lower platen 14 carried on a base 16, and with the base having upright posts 18 secured thereto on which is slidably mounted an upper platen 20 carried by a crosshead 22 whose vertical position is controlled by one or more prime mover means, such as a fluid pressure motor 24.

I have illustrated the platens 14 and 20 as having chambers 26 and 28 therein for the reception of steam or other heating fluid, although it is to be clearly understood that such fluid heating chambers may be provided directly in the mold parts 10 and 12 in accord with known practice if this be desired. Also, each of the mold parts 10 and 12 are mounted upon their respective platens with a ring of sealing material 30 and 32 between the mold and platen so that no fluid can escape between the mold and platen, all for purposes hereinafter to be described. The platen 20 is also provided with a sealing ring 34 between it and the crosshead 22 for a like purpose.

Carried by one of the platen members, and conveniently the lower platen 14, is a header mechanism indicated as a whole by the numeral 40. The header mechanism 40 comprises a shaft 42 which extends slidably, but in keyed relation through a gland nut 44 carried by the platen 14, the shaft being connected to suitable prime mover means in the base 16 of the apparatus so that the shaft can be raised or lowered as desired. The prime mover conveniently takes the form of a fluid pressure cylinder 46, the piston of which is connected to the shaft 42.

The upper end of the shaft 42 is shouldered, as at 48, and a round plate 50 rests upon the shoulder. A second round plate 52 is also received upon the upper end of the shaft, the second plate being held in spaced relation from the first plate 50 by a spacer sleeve 54. A third plate 56 is also mounted upon the upper end of the shaft, and is held in spaced relation from the plate 52 by a spacer sleeve 58. A nut 60 threaded upon the upper end of the shaft holds the several plates and sleeves in assembled relation. In order to further strengthen and support the plates 52, 50 and 56, I preferably provide additional posts between the plates, for example, the posts 62 at three points 120° apart between the plates 50 and 52, and three posts 64 between the plates 52 and 56 at three points spaced 120° apart. The posts 62 are 60° from the posts 64. The posts 62 and 64 both have reduced diameter end portions which are received in appropriate holes in the plates, the ends of the reduced diameter end portions being peened over, or otherwise removably fastened in the plates to complete the assembly.

Mounted between the plates 52 and 56 is a seal ring 70 which is made of strong and tough rubber stock, for example, of tire tread consistency or air bag composition, and the seal ring may be reenforced with fabric if desired. At three points around the seal ring I mold integrally therewith, or otherwise secure thereto, a cage or yoke, each yoke comprising, as best seen in Fig. 1, a U-shaped metal frame member 72, the legs of which are directed inwardly towards the shaft 42, and with a roller 74 being rotatably supported between the legs of the cage 72. Also, each cage 72 has an upstanding pin 76 secured therein which is slidably recevied in a slot 78 formed in the plate 56.

Rotatably mounted upon the top of the plate 56 is a lock ring 80, and the rotatable mounting of the ring 80 is achieved by the provision of a plurality of flanged rollers, such as six, and indicated by the numeral 82, which are journaled on vertical axes on the top of the plate 56, and which have flange portions overlying the lock ring 80 and holding the lock ring in position for partial rotary movement about the rollers 82. The lock ring 80 is formed with three ears 84 positioned at points 120° apart on the lock ring, each ear being adjacent a pin 76. The ears 84 have an inclined surface 86 and a recess 88, and the lock ring is normally urged in a clockwise direction (Fig. 1) by a spring 90 to hold the pins 76 in the recesses 88 of the locking ears 84 to thereby normally hold the seal ring 70 in collapsed position.

Wedge plates 92 are carried on a circular or other base secured to the upper platen 20, the wedge plates 92 being equal in number to the number of cages 72, namely, three, and being positioned 120° apart, and so that upon the closing of the mold parts together the wedge plates will engage behind the rollers 74 to move the rollers and cages towards the shaft 42 to collapse the seal ring 70 at three points and to draw the seal ring substantially into contact with the spacer posts 64 at three mid-points. Once the seal ring 70 is collapsed the lock ring 80 will hold it in collapsed position, the pins 76 riding down the cam surfaces 86 of the ears 84 and falling into the recesses 88, the spring 90 yielding during this action but snapping the lock ring around through a small arc in a clockwise direction to lock the pins 76 in the recesses 88. Slots 94 in the plate 56 permit the entry of the wedge plates 92 into engagements with the rollers 74.

With the seal ring in the collapsed position just described, and with the molds in the open position shown in Fig. 3, it is readily possible to drop a substantially flat built tire carcass T over the header mechanism 40, so that the lower tire bead of the tire carcass rests on the bead seat of the lower mold half 10, it being understood that the diameter of the plates 50, 52 and 56 of the header mechanism are slightly less than the internal diameter of the beads of the tire carcass, in fact, of a diameter to just clear the inside diameter of the mold halves.

Now with the tire carcass in place as shown in Fig. 3, and as just described, a knob 96 on the lock ring 80 is grasped by the operator and the lock ring is rotated about the rollers 82 and against the action of the spring 90 so that the pins 76 are released out of the recesses 88 whereupon the seal ring 70 snaps out to its full position shown in Fig. 3 of the drawings wherein it lies over the top of the upper bead of the tire carcass T. If the seal ring 70 is reenforced with fabric or is made of a sufficiently heavy construction, it may have sufficient inherent strength for the shaping operation to follow, and it is not necessary to back up the seal ring with any additional means. However, I have found that it is preferable, and eliminates any possibility of seal ring movement to provide some additional means for backing up the seal ring 70 during the shaping operation. The back-up means also preferably function to seal the header during the shaping operation. Such means may take a variety of forms, any suitable, simple, expanding or back-up mechanism being satisfactory. One typical form of such means comprises, as illustrated in Fig. 3, a removable cap or cover 100, having a skirt portion 102, which engages behind the seal ring 70, and with the cap having a central, apertured boss 104 which slides over a reduced diameter end portion 106 of the shaft 42. A wedge pin 108 engages between a tapered slot in the shaft end 106 and the upper end of the boss 104 to tightly lock, but in a quickly removable manner, the cap 100 over the header mechanism.

The cap 100 also carries three wedge plates 110 positioned 120° apart around the cap which are adapted to extend down through the slots 94 and which engage behind rollers 74 of the cages to positively expand the seal ring out to its full or normal position in case it has not moved completely to this position. Handles 112 on the cap 100 facilitate the handling of the cap 100 by the operator.

Completing the description of the seal ring 70 and its function in the apparatus combination, with the parts as shown in Fig. 3, the fluid pressure motor 46 is energized to move the header mechanism 40 towards the lower platen 14, and to thus move the beads of the tire carcass T towards each other, and at the same time, fluid under pressure is applied to the interior of the tire carcass by a conduit 114 extending from the control mechanism 116. The seal ring 70 and cap 100 sufficiently prevent the escape of the fluid. The result is that the tire carcass T is shaped from the flat or pulley band shape down to a true toric or tire shape, the bias cut cord fabric carcass of the tire having the cords pantograph in a manner familiar to those skilled in the art.

The fluid under pressure is now exhausted from the interior of the tire carcass, the wedge pin 108 is removed and the cap 100 is lifted off the header mechanism by the operator. The seal ring 70 continues to hold the tire in shaped position until the mold parts begin to close around it. The closing of the upper mold half around the tire carcass and the bringing of the molds into full engagement with each other is effected by the fluid pressure motor 24, and as the upper mold half moves into position, the wedge plates 92 carried by the upper platen 20 engage behind the rollers 74 of the cages 72 to collapse the seal ring 70, and during this collapsing movement, as heretofore described, the pins 76 carried by the cages ride down the cam surfaces 86 of the ears 84 on the lock ring 80 and fall into the recesses 88 under the action of the spring 90 so that the seal ring 70 is held in collapsed position during the vulcanizing operation, during the time the tire is removed after vulcanization and while a new unvulcanized or green tire carcass is positioned over the header mechanism, all as above set forth I have thought it advisable to complete the description of the sealing ring operation in conjunction with the description of the structure thereof, but it is to be understood that other mechanism in the combination will be functioning concurrently with the operation of the sealing ring, and the correlation of such other mechanism, its structure and function, will now be described.

Associated with the header mechanism is a second contractible and expansible member, which is conveniently called a bull ring and which is designated by the numeral 120. The bull ring is mounted between the plates 50 and 52, and is illustrated in collapsed position in Fig. 3 and in expanded position in Fig. 2. The bull ring 120 is conveniently made of good rubber stock, for example, of a tire tread or air bag compound, and may or may not be reenforced with fabric. In its expanded position, as seen in Fig. 2, the bull ring 120 lies between the beads of the tire carcass T, and the bull ring is of a thickness in a vertical direction, that is, in a direction between the beads even though this is not vertical in a patricular installation, which is somewhat greater than the distance between the beads when the tire mold halves are closed. This means that the bull ring engages with the beads of the tire during the closing of the tire mold to very tightly hold or force the beads of the tire into engagement with the bead seats of the mold. This is a very important function of the bull ring inasmuch as it effects a sealing of the tire beads with respect to the bead seats of the molds and prevents any vulcanizing fluid or pressure fluid from getting behind or between the tire carcass and the mold.

The bull ring 120 is collapsed by any suitable mechanism, and one convenient way to accomplish the collapsing of the bull ring is to secure cables 122 to a base plate 123 mounted by screws 125 on the lower platen 14, which cables run up over pulleys 124 carried by the plate 50, and with the upper ends of the cables being secured to hooks 126 embedded in the bull ring. It will be understood that any desired number of cables may be employed, but I conveniently utilize three cables which are placed 120° apart, it being evident from Fig. 1 that each cable is placed midway between the cages 72 associated with the seal ring 70 and used to collapse the seal ring. Thus, when the header mechanism is in the open or uppermost position shown in Fig. 3, the cables will be taut and will have collapsed the bull ring 120 to the dotted line position shown in Fig. 1, but when the header mechanism is moved downwardly towards the lower platen, the bull ring 120 is free to move to its normal or full position, which might be termed its expanded position as distinguished from its collapsed position. This is achieved by the slacking off of the cables 122 in a manner which will be understood. To assist in expanding the bull ring 120, I may mount a plurality of wedge plates 128, usually three, on a base plate 123 secured to the lower platen 14, which wedge plates pass through slots 130 in the lower plate 50 of the header mechanism and engage behind the bull ring 120 and which function to move and hold the bull ring in its expanded position as shown in Fig. 2. The bull ring may have metal wear-plates molded therein or secured thereto in the areas contacted by the wedge plates 128.

With the bull ring in its expanded position and with the apparatus in closed position as shown in Fig. 2, fluid under pressure is introduced between the platens and into the chambers marked C by means of a conduit 134 passing from control mechanism 136. Preferably the pressure fluid is also heated, for example, being steam, hot water, or other liquids or gases or combinations thereof so that a vulcanizing action on the tire is effected from the inside out as well as from the outside in. It will be seen that the bull ring 120 is vented, as at 138, so that any pressure fluid in the chambers C will flow readily into the inside of the tire T, and will serve to hold the tire out tightly against the mold during the vulcanizing operation, and I may provide for adequate circulation of the pressure fluid through the chambers C and the inside of the tire carcass during vulcanization.

It may be advisable to employ an extra friction or skin coat of rubber on the inside of the inside ply of the tire, or even an extra sheet of rubber on the inside of the inside ply of the tire, to prevent any loss of pressure or pressure fluid into or through the tire carcass during the vulcanizing operation.

Upon the completion of the vulcanizing operation just described, the fluid under pressure is removed from the chambers C and the inside of the tire carcass, and the mold halves 10 and 12 are moved apart by actuation of the fluid pressure means 24. Simultaneously the header mechanism 40 is raised by the fluid pressure motor 46, and this will collapse the bull ring 120 in the manner heretofore described. It might be noted that in the breaking apart of the molds 10 and 12, any possibility of the vulcanized tire sticking in the upper mold half is substantially eliminated by the hold down action effected by the bull ring 120. With the bull ring 120 collapsed and out of position between the beads of the tire, it is a relatively simple matter to remove the tire by hook, bar, hand, or other means, whereupon the apparatus is ready for a second shaping and vulcanizing operation.

It may be advisable to extend a plurality of cables 140 between the lower platen 14 and the periphery of the bottom plate 50, each of such cables normally collapsing and being wound up on a spring wound spool 142 when the header mechanism is moved to vulcanizing position, and the cables expanding from the spring wound spools when the header mechanism is in the loading position of Fig. 2. Usually, some six or more of these cables are positioned around the circumference of the plate 50 and act as guiding means for putting a green tire carcass over the header mechanism or during the removal of a vulcanized tire.

From the foregoing, it will be evident that the various objects of my invention have been achieved by the provision of a combined shaping and vulcanizing apparatus which avoids and overcomes the difficulties of known combination machines. I am able to avoid the use of collapsible bags or diaphragms with the attendant difficulties thereof, and have provided a relatively simple, inexpensive, durable, apparatus for rapidly and effectively shaping and vulcanizing tires, this apparatus being adapted to installation with existing presses, and capable of use with vulcanizing mediums or fluids of various types including high frequency vulcanizing means.

While in accord with the patent statutes, I have specifically illustrated and described my invention, it is to be particularly understood that I am not to be limited thereto or thereby, but that the scope of my invention is defined in the appended claims.

I claim:

1. Apparatus for shaping and vulcanizing pneumatic tires including a lower platen, a tire mold half mounted in sealing relation on the lower platen, an upper platen, a complementary tire mold half mounted in sealing relation on the upper platen, a header carried by one of the platens, a seal ring carried by the header and adapted to engage with a tire bead of a substantially flat built tire when the other bead is engaging with the bead seat of one of the mold halves, means for moving the header to force the tire beads towards each other, means for supplying fluid under pressure to the inside of the tire carcass during the movement of the beads together to shape the tire carcass, a collapsible bull ring carried by the header, means for expanding the bull ring between the tire beads as they move together, means for moving the platens together to bring the mold halves into register and to cause the bull ring to force the beads into sealing relation with the mold halves, means for collapsing the seal ring prior to movement of the mold halves into register, and separate means for supplying steam under pressure between the platens, said bull ring being vented to allow the fluid to flow inside the tire and force it against the mold, and the bull ring being thicker than the distance between the tire beads when the mold is closed.

2. Apparatus for shaping and vulcanizing pneumatic tires including a lower platen, a tire mold half mounted in sealing relation on the lower platen, an upper platen, a complementary tire mold half mounted in sealing relation on the upper platen, a header carried by one of the platens, a seal ring carried by the header and adapted to engage with a tire bead of a substantially flat built tire when the other bead is engaging with the bead seat of one of the mold halves, means for moving the header to force the tire beads towards each other, means for supplying fluid under pressure to the inside of the tire carcass during the movement of the beads together to shape the tire carcass, a collapsible bull ring carried by the header, means for expanding the bull ring between the tire beads as they move together, means for moving the platen together to bring the mold halves into register and to cause the bull ring to force the beads into sealing relation with the mold halves, means for collapsing the seal ring prior to movement of the mold halves into register, and means for supplying fluid under pressure to the inside of the tire to force the tire against the mold, said bull ring being thicker than the distance between the tire beads when the mold is closed.

3. Apparatus for shaping and vulcanizing pneumatic tires including a tire mold half, a complementary tire mold half, a header between the mold halves, a seal ring carried by the header and adapted to engage with a tire bead of a substantially flat built tire when the other bead is engaging with the bead seat of one of the mold halves, means for moving the header to force the tire beads towards each other, means for supplying fluid under pressure to the inside of the tire carcass during the movement of the beads together to shape the tire carcass, a collapsible bull ring carried by the header, means for expanding the bull ring between the tire beads as they move together, means for moving the mold halves into register and to cause the bull ring to force the beads into sealing relation with the mold halves, means for collapsing the seal ring prior to movement of the mold halves into register, and means for again supplying fluid under pressure to the inside of the tire to force the tire against the mold, and the bull ring being thicker than the distance between the tire beads when the mold is closed.

4. Apparatus for shaping and vulcanizing pneumatic tires including a tire mold half, a complementary tire mold half, a header between the mold halves, a seal ring carried by the header and adapted to engage with a tire bead of a substantially flat built tire when the other bead is engaging with the bead seat of one of the mold halves, means for moving the header to force the tire beads towards each other, means for supplying fluid under pressure to the inside of the tire carcass during the movement of the beads together to shape the tire carcass, a collapsible bull ring carried by the header, means for expanding the bull ring between the tire beads as they move together, means for moving the mold halves into register and to cause the bull ring to force the beads into sealing relation with the mold halves, means for collapsing the seal ring prior to movement of the mold halves into register, and means for supplying steam under pressure to the inside of the tire to force the tire against the mold, said bull ring being thicker than the distance between the tire beads when the mold is closed.

5. Apparatus for vulcanizing pneumatic tires including relative movable complementary mold parts, header means to positively engage one bead of a tire carcass and to move the bead towards the opposite bead carried on the bead seat of one of the mold parts, said header means and said one mold part being in airtight engagement with the beads of a tire carcass when the apparatus is operatively engaged with a tire carcass for initial action thereon, means for supplying pressure fluid directly to the inner surface of the tire carcass as the beads are moved together, a collapsible ring carried by the header means and movable to an expanded position between the tire beads to force the beads into sealing engagement with the mold parts, means for moving the mold parts together, means for simultaneously expanding the ring carried by the header means, and separate means for supplying pressure fluid between the mold parts, said ring having a thickness greater than the distance between the tire beads when the mold is closed, said last named means forcing a tire carcass into engagement with the mold halves.

6. Apparatus for vulcanizing pneumatic tires including relative movable complementary mold parts, header means to positively engage one bead of a tire carcass and to move the bead towards the opposite bead carried on the bead seat of one of the mold parts, means for supplying pressure fluid directly to the inner surface of the tire carcass as the beads are moved together, a collapsible solid substantially rectangular in section ring carried by the header and movable between the tire beads to force the beads into sealing engagement with the mold parts, means for moving the mold parts together, and means for simultaneously expanding the ring, said ring having a thickness greater than the thickness between the beads when the mold is closed.

7. Apparatus for vulcanizing pneumatic tires including a pair of complementary, relatively movable mold parts, a header mechanism positioned between the mold parts, a collapsible rubber bull ring carried by the mechanism, means for collapsing the bull ring within the mechanism, a collapsible rubber seal ring carried by the mechanism, said mechanism being of a size to allow a flat built tire carcass to be placed thereover with one tire bead on the bead seat of a mold part and the other tire bead engaging with the seal ring, means for moving the mechanism to move the tire beads together, means for simultaneously introducing fluid inside the carcass to expand the tire to toric form, means for releasing the bull ring collapsing means to allow the bull ring to expand to a position between the beads of the tire, means for relatively moving the mold parts together around the tire and for simultaneously collapsing the seal ring, and means for introducing fluid under pressure between the mold parts to force the tire into engagement with the mold, the bull ring being thicker than the distance between the beads to seal the beads against the mold parts.

8. Apparatus for vulcanizing pneumatic tires including a pair of complementary, relatively movable mold parts, a header mechanism positioned between the mold parts, a collapsible rubber seal ring carried by the mechanism, said mechanism being of a size to allow a flat built tire carcass to be placed thereover with one tire bead on the bead seat of a mold part and the other tire bead engaging positively with the seal ring, means for moving the mechanism to move the tire beads together, means for simultaneously introducing fluid inside and directly in contact with the carcass to expand the tire to toric form, and means for relatively moving the mold parts together around the tire and for simultaneously collapsing the seal ring out of engagement with the tire bead.

9. Apparatus for vulcanizing pneumatic tires including a pair of complementary, relatively movable mold parts, a header mechanism positioned between the mold parts, a collapsible rubber bull ring carried by the mechanism, said mechanism being of a size to allow a flat built tire carcass to be placed thereover, means for expanding the bull ring to a position between the beads of the tire, means for relatively moving the mold parts together around the tire, and means for introducing fluid under pressure between the mold parts to force the tire into engagement with the mold, the bull ring being thicker than the distance between the beads to seal the beads against the mold parts.

10. Apparatus for vulcanizing pneumatic tires including a pair of complementary molds mounted for relative movement to and from engagement with each other, means for moving one of the molds, collapsible means positioned between the molds for engaging a tire bead of a substantially flat built tire carcass and for moving the bead toward the other tire bead, means for applying a differential fluid pressure on the tire carcass during the movement of the beads together to shape the tire carcass to toric form, expansible means movable between the beads of the shaped carcass, said expansible means being of a thickness to hold the beads against the mold parts in sealing relation when the mold parts are closed around the tire, means for collapsing the collapsible means as the mold parts are closed around the tire, and a second means for supplying fluid under pressure to the inside of the tire after the mold parts are closed around the tire, said expansible means having radial openings therein so as to have fluid pressure on both the radially inner and radially outer surfaces thereof.

11. Apparatus for vulcanizing pneumatic tires including a pair of complementary molds mounted for relative movement to and from engagement with each other, means for moving one of the molds, collapsible means positioned between the molds for engaging a tire bead of a substantially flat built tire carcass and for moving the bead toward the other tire bead, means for applying a differential fluid pressure on the tire carcass during the movement of the beads together to shape the tire carcass to toric form, expansible means movable between the beads of the shaped carcass, said expansible means being of a thickness to hold the beads against the mold parts in sealing relation when the mold parts are closed around the tire, means for collapsing the collapsible means as the mold parts are closed around the tire, and second means for supplying fluid under pressure to the inside of the tire after the mold parts are closed around the tire.

12. Tire vulcanizing apparatus including a pair of complementary mold parts, a header mechanism mounted between the mold parts, a bull ring carried by the mechanism, means for expanding and contracting the bull ring to move it to and from a position between the beads of a tire received in the mold parts, and means for supplying fluid under pressure to the interior of the tire, said bull ring being vented and the molds being closed top and bottom to form a hollow substantially cylindrical chamber, the vents in said bull ring connecting the chamber and the interior of the tire whereby fluid under pressure engages both the radially inner and outer surfaces of the bull ring.

13. Tire vulcanizing apparatus including a pair of complementary mold parts, a header mechanism mounted between the mold parts, a collapsible seal ring carried by the mechanism, the mechanism being of a size to allow a substantially flat built tire to be positioned thereover with one bead of the tire in engagement with the bead seat of a mold part, automatic lock means associated with the seal ring to hold it in collapsed position but which when released allows the seal ring to move into engagement behind the second bead of the tire, means for moving the mechanism to move the tire beads together, means for introducing fluid under pressure inside the tire during movement of the beads together, means for locking and holding the seal ring in expanded position, means for moving the mold parts together after the shaping of the tire, and means carried by a mold part for collapsing the seal ring to automatic locking position.

14. Tire vulcanizing apparatus including a pair of complementary mold parts, a header mechanism mounted between the mold parts, a collapsible seal ring carried by the mechanism, automatic lock means associated with the seal ring to hold it in collapsed position but which when released allows the seal ring to move to expanded position, means for locking and holding the seal ring in expanded position, means for moving the mold parts together, and means carried by a mold part for collapsing the seal ring to automatic locking position.

15. In combination, a pair of complementary tire molds movable to and from mating relation, a collapsible non-inflatable header positioned between the molds and adapted when expanded to engage a bead of a substantially flat built tire carcass, the other tire bead being adapted to be received on the bead seat of one of the tire molds, means for moving the header to move the beads of the tire carcass together, means for supplying fluid under pressure to the interior of the tire carcass during the movement of the beads together, and a cap removably mounted on the header and sealing the header against loss of fluid from inside the carcass during the movement of the beads together.

16. In apparatus for shaping and vulcanizing tires, complementary, relatively movable mold parts, a collapsible and expansible header positioned between the mold parts, said header when collapsed being of a diameter to pass through the tire beads of a tire to be vulcanized as the tire carcass is slipped over the header from above, and the header when expanded being of a diameter to engage the tire bead, a collapsible and expansible but non-inflatable bull ring carried by the header, and means for effecting movement of the header toward and from one of the mold parts, the header when expanded engaging the bead of the tire to be vulcanized as the mold parts are moved together until immediately prior to engagement of the bull ring with said tire bead.

THOMAS A. KOLINS.

REFERENCES CITED

The following references are of record in the file of this patent:

UNITED STATES PATENTS

| Number | Name | Date |
| --- | --- | --- |
| 1,389,442 | De Mattia | Aug. 30, 1921 |
| 1,437,433 | McClurg | Dec. 5, 1922 |
| 1,528,659 | De Mattia | Mar. 3, 1925 |
| 1,734,766 | Fetter | Nov. 5, 1929 |
| 1,875,816 | Krause | Sept. 6, 1932 |
| 1,892,942 | Gammeter | Jan. 3, 1933 |
| 1,932,692 | Fetter | Oct. 31, 1933 |
| 1,942,797 | Bittaker | Jan. 9, 1934 |
| 1,989,363 | Iverson | Jan. 29, 1935 |
| 2,025,992 | Laursen | Dec. 31, 1935 |
| 2,198,493 | Freeman | Apr. 23, 1940 |
| 2,243,532 | Maynard | May 27, 1941 |
| 2,272,887 | Allen | Feb. 10, 1942 |
| 2,296,800 | Soderquist | Sept. 22, 1942 |